United States Patent
Nakazato et al.

(10) Patent No.: US 12,457,525 B2
(45) Date of Patent: Oct. 28, 2025

(54) CONTROL SYSTEM, CONTROL METHOD, AND CONTROL PROGRAM

(71) Applicant: RAKUTEN MOBILE, INC., Tokyo (JP)

(72) Inventors: Jin Nakazato, Tokyo (JP); Saki Tanaka, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/918,724

(22) PCT Filed: Aug. 6, 2021

(86) PCT No.: PCT/JP2021/029455
§ 371 (c)(1),
(2) Date: Oct. 13, 2022

(87) PCT Pub. No.: WO2023/013084
PCT Pub. Date: Feb. 9, 2023

(65) Prior Publication Data
US 2024/0224121 A1 Jul. 4, 2024

(51) Int. Cl.
*H04W 28/16* (2009.01)
*G06V 10/40* (2022.01)
(Continued)

(52) U.S. Cl.
CPC ............ *H04W 28/16* (2013.01); *G06V 10/40* (2022.01); *G06V 20/52* (2022.01); *G06V 20/60* (2022.01);
(Continued)

(58) Field of Classification Search
CPC ....... H04W 28/16; G06V 10/40; G06V 20/52; G06V 20/60; G06V 40/10; G06V 40/20; G06V 2201/08
(Continued)

(56) References Cited

U.S. PATENT DOCUMENTS 9,381,852 B2 * 7/2016 Foltin .................. G06V 20/584
10,951,830 B2 * 3/2021 Hei ........................ G06V 20/56
(Continued)

FOREIGN PATENT DOCUMENTS

JP    2004088695 A  *  3/2004
JP    2017147625 A  *  8/2017
(Continued)

OTHER PUBLICATIONS

Nishimura Yasushi, Mobile Wireless Terminal Device (JP 2004088695 A), Mar. 18, 2004, Toshiba Corp, All Pages and Figures. (Year: 2004).*

(Continued)

*Primary Examiner* — Mahendra R Patel
(74) *Attorney, Agent, or Firm* — Sughrue Mion, PLLC

(57) ABSTRACT

An objective is to provide a control system, a control method, and a control program that can appropriately set a base station forming a small cell.

A detection unit (811) detects a prescribed object in an image acquired by a camera. An extraction unit (812) extracts, from the image, object information relating to the detected object. A prediction unit (813) predicts, based on the object information, communication demand for a base station from a radio terminal that the detected object has. A determination unit (820) determines a setting of the base station based on the predicted communication demand. A control unit (830) controls the base station in accordance with the determined setting.

13 Claims, 10 Drawing Sheets

(51) Int. Cl.
  *G06V 20/52* (2022.01)
  *G06V 20/60* (2022.01)
  *G06V 40/10* (2022.01)
  *G06V 40/20* (2022.01)
(52) U.S. Cl.
  CPC .............. *G06V 40/10* (2022.01); *G06V 40/20* (2022.01); *G06V 2201/08* (2022.01)
(58) Field of Classification Search
  USPC ...................................................... 455/422.1
  See application file for complete search history.

(56) References Cited

U.S. PATENT DOCUMENTS

| | | | |
|---|---|---|---|
| 11,768,082 B2* | 9/2023 | Cui | G01C 21/3691 |
| | | | 701/533 |
| 12,045,056 B2* | 7/2024 | Suzuki | G05D 1/0274 |
| 2013/0195372 A1* | 8/2013 | Ogawa | H04N 19/176 |
| | | | 382/238 |
| 2015/0222813 A1* | 8/2015 | Okude | G01C 21/3602 |
| | | | 701/523 |
| 2016/0337251 A1* | 11/2016 | Venkataramanan | |
| | | | H04L 47/2441 |
| 2018/0017659 A1* | 1/2018 | Irie | G01S 3/7864 |
| 2020/0402256 A1* | 12/2020 | Kobayashi | G05D 1/0251 |
| 2021/0225028 A1* | 7/2021 | Konagai | G01C 21/28 |
| 2021/0264224 A1* | 8/2021 | Tamaoki | G01S 13/867 |
| 2021/0266715 A1* | 8/2021 | Uchiyama | H04W 4/48 |

FOREIGN PATENT DOCUMENTS

| | | | | |
|---|---|---|---|---|
| JP | 6301766 B2 | * | 3/2018 | |
| JP | 2018195928 A | * | 12/2018 | ........... H04B 17/309 |

OTHER PUBLICATIONS

Iwabuchi Tadashi, Communication System, Control Method of Communication System, Control Station (JP 2017147625 A), Aug. 24, 2017, Nippon Telegraph & Telephone, All Pages and Figures. (Year: 2017).*

International Search Report for PCT/JP2021/029455 dated Oct. 12, 2021.

* cited by examiner

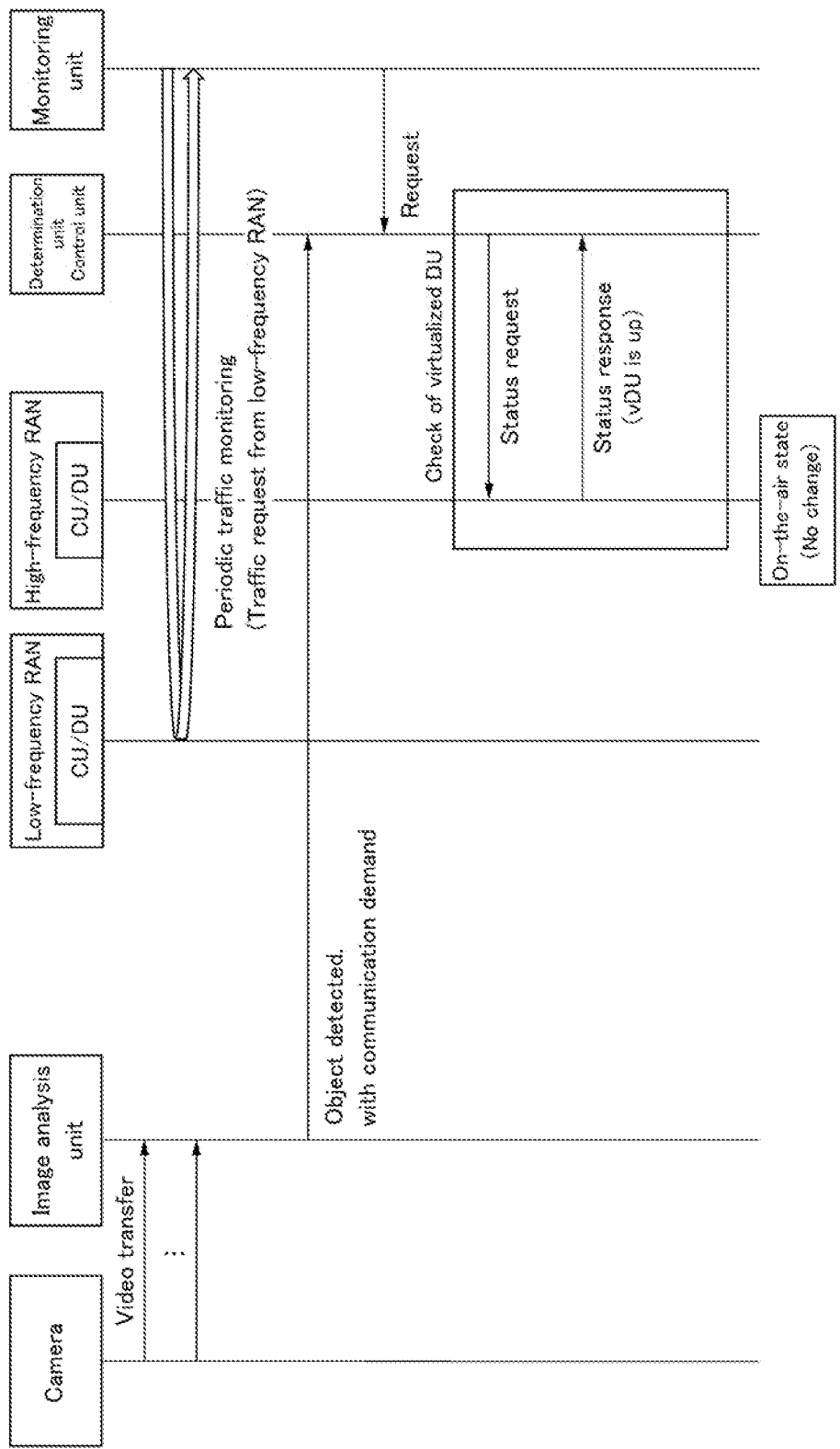

CONTROL SYSTEM, CONTROL METHOD, AND CONTROL PROGRAM

CROSS REFERENCE TO RELATED APPLICATIONS

This application is a National Stage of International Application No. PCT/JP2021/029455 filed Aug. 6, 2021.

TECHNICAL FIELD

The present invention relates to a control system, a control method, and a control program.

BACKGROUND

In 5th generation mobile communication systems (5G: 5th Generation mobile communication systems) and Beyond 5G (hereinafter referred to as B5G)/6G systems that are being considered as next-generation communication schemes, the use of higher carrier frequencies and wider frequency bandwidths in comparison with LTE (long term evolution)/LTE-Advanced systems in order to obtain higher speeds and higher capacities is being considered.

Although 5G/B5G/6G systems can attain higher speeds and higher capacities, the carrier frequencies that are used are higher and the coverage areas thereof (known as small cells) are smaller. Therefore, in 5G/B5G/6G systems, in order to realize coverage areas (known as macrocells) that are the same as those in LTE/LTE-Advanced systems, more base stations need to be installed, thereby increasing the power consumption. Additionally, in 5G/B5G/6G systems, it is possible to have many simultaneous connections. Thus, the processing amounts in the systems overall are expected to increase.

Patent Document 1 discloses a method for using a captured image of a coverage area of a base station, captured by a camera, to change base station parameters.

CITATION LIST

Patent Literature

Patent Document 1: JP 6301766 B

SUMMARY OF INVENTION

Technical Problem

However, there is room for improvement regarding how the settings in a base station forming a small cell are controlled.

An objective of the present invention is to provide technology for appropriately setting a base station for forming a small cell.

Solution to Problem

One embodiment of the control system according to the present invention comprises: a detection unit that detects a prescribed object in an image acquired by a camera; an extraction unit that extracts, from the image, object information relating to the detected object; a prediction unit that predicts, based on the object information, communication demand for a base station from a radio terminal that the detected object has; a determination unit that determines a setting of the base station based on the predicted communication demand; and a control unit that controls the base station in accordance with the determined setting.

In one embodiment of the control system according to the present invention, the object information includes at least one of object attribute information relating to an attribute of the object and object behavior information relating to a behavioral characteristic of the object.

In one embodiment of the control system according to the present invention, the control system further comprises a monitoring unit that monitors communication information relating to communication between the radio terminal and a second base station having a coverage area at least partially overlapping with a coverage area of a first base station, which is the aforementioned base station, and using a carrier frequency lower than a carrier frequency of the first base station; and the determination unit determines the setting further based on the monitored communication information.

In one embodiment of the control system according to the present invention, the communication information includes at last one of traffic volume and data type.

In one embodiment of the control system according to the present invention, the first base station, which is the aforementioned base station, comprises an RU (Radio Unit), a DU (Distributed Unit), and a CU (Centralized Unit); the determination unit determines, as the setting, that the RU in the first base station is to be turned either on or off; and the control unit controls the first base station to be in either an off-the-air state or an on-the-air state by controlling the RU in the first base station to be either on or off.

In one embodiment of the control system according to the present invention, the first base station, which is the aforementioned base station, comprises an RU (Radio Unit), a virtualized DU (Distributed Unit), and a virtualized CU (Centralized Unit); the determination unit determines, as the setting, whether to delete or to instantiate the virtualized DU; and the control unit controls the first base station to be in an off-the-air state by deleting the virtualized DU, and controls the first base station to be in an on-the-air state by instantiating the virtualized DU.

In one embodiment of the control system according to the present invention, the first base station, which is the aforementioned base station, comprises an RU (Radio Unit), a virtualized DU (Distributed Unit), and a virtualized CU (Centralized Unit); the determination unit determines, as the setting, whether to delete, to scale in, to scale out, or to instantiate the virtualized DU; and the control unit controls the first base station to be in an off-the-air state by deleting the virtualized DU, and controls the first base station to be in an on-the-air state by scaling in, scaling out, or instantiating the virtualized DU.

In one embodiment of the control system according to the present invention, the object is a person; the object attribute information includes at least one of an age of the person, a sex of the person, and a type of radio terminal that the person has; and the object behavior information includes at least one of a movement speed of the person, an amount of change in the movement speed of the person within a prescribed time period, a stationary time period of the person, and information relating to a carrying mode indicating how the person is carrying the radio terminal.

In one embodiment of the control system according to the present invention, the object is a vehicle; the object attribute information includes at least one of information indicating whether or not the vehicle has functions of an ICT (Information and Communication Technology) terminal, and a type of radio terminal that the vehicle has; and the object behavior information includes at least one of a movement speed of the vehicle, an amount of change in the movement speed of the vehicle within a prescribed time period, and a stationary time period of the vehicle.

In one embodiment of the control system according to the present invention, the image is an image of at least a part of a coverage area of a first base station, which is the aforementioned base station.

One embodiment of a control method according to the present invention is a control method performed by one or more processors, including: a step of detecting a prescribed object in an image acquired by a camera; a step of extracting, from the image, object information relating to the detected object; a step of predicting, based on the object information, communication demand for a base station from a radio terminal that the detected object has; a step of determining a setting of the base station based on the predicted communication demand; and a step of controlling the base station in accordance with the determined setting.

One embodiment of a control program according to the present invention makes one or more processors execute the respective units in the above-mentioned control system.

Effects of Invention

According to the present invention, a base station forming a small cell can be appropriately set.

BRIEF DESCRIPTION OF DRAWINGS

FIG. 6D is a diagram illustrating an example of a processing sequence implemented in the control system according to an embodiment.

DESCRIPTION OF EMBODIMENTS

Hereinafter, an embodiment of the present invention will be explained in detail with reference to the drawings.

EMBODIMENT

Figure 1:
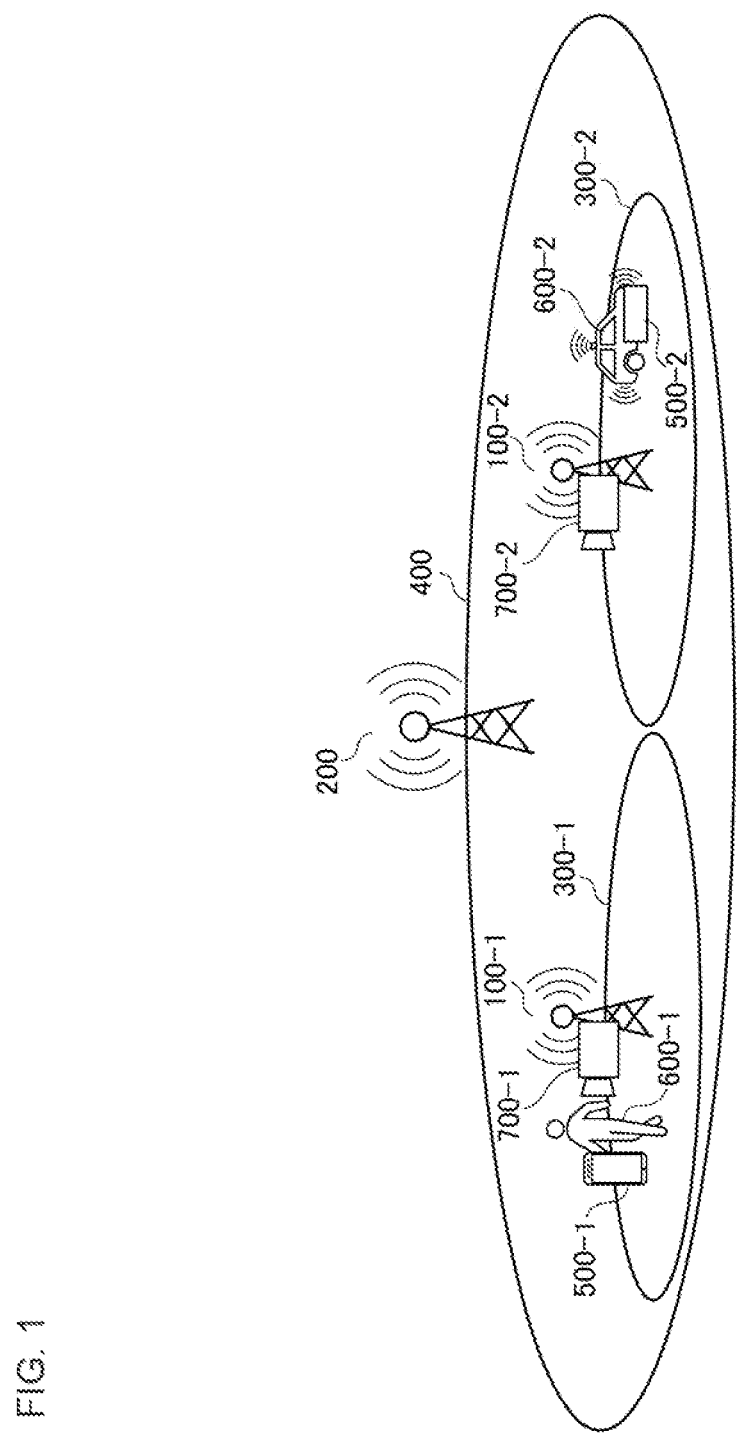
FIG. 1 is a schematic diagram illustrating an example of a radio communication system to which a control system according to an embodiment of the present invention is applied.

FIG. 1 is a diagram illustrating an example of a radio communication system to which a control system according to an embodiment of the present invention is applied. In the radio communication system in FIG. 1, base stations 100-1, 100-2 (hereinafter referred to collectively as base stations 100) are, for example, base stations known as gNBs as defined in a 5G system, or are base stations in a post-5G next-generation radio communication system such as a B5G/6G system. Additionally, a base station 200 is, for example, a base station known as an eNB, as defined in LTE (long term evolution) or LTE-Advanced. The base station 200 is not limited to being a base station in an LTE/LTE-Advanced system and may be a base station in an earlier mobile communication network system. Additionally, the base station 200 may be a base station in a Sub6 system of a next-generation system, in which the carrier frequency band is lower than the carrier frequency band of the base stations 100.

In FIG. 1, small cells 300-1, 300-2 (hereinafter referred to collectively as small cells 300) indicate the serviceable coverage areas formed by the respective base stations 100-1, 100-2. A macrocell 400 indicates the serviceable coverage area formed by the base station 200.

As mentioned above, the frequency bands used by the base stations 100 comprise higher frequencies than the frequency band used by the base station 200. Thus, the small cells 300-1, 300-2 of the base stations 100 have smaller areas than the macrocell 400. In the example illustrated in FIG. 1, the case in which the macrocell 400 of the base station 200 contains two base stations 100 (100-1, 100-2) is illustrated. However, the number of base stations 100 is not limited thereto, and there may be three or more base stations 100.

An object 600-1 is a person carrying a UE (User Equipment) 500-1. An object 600-2 is a vehicle provided with an ICT (Information and Communication Technology) terminal 500-2. An example of the object 600-2 is a connected car.

The UE 500-1 and the ICT terminal 500-2 are radio terminals (hereinafter sometimes referred to as terminals or UEs) that are served by the base stations 100 and/or the base station 200.

A control system 800 according to the present embodiment uses images captured by cameras 700-1, 700-2 (hereinafter referred to collectively as cameras 700). The cameras 700, for example, capture images of at least parts of the small cells 300 of the base stations 100. In the example illustrated in FIG. 1, the camera 700-1 is installed on the base station 100-1 and the camera 700-2 is installed on the base station 100-2. The installation method of the cameras 700 is not limited thereto. The cameras 700 may be installed near the borders of adjacent small cells 300-1, 300-2, and may capture images of multiple small cells 300-1, 300-2 adjoining the cameras 700. Additionally, one or more cameras may be installed in the small cells 300-1, 300-2. Additionally, if cameras having a 360-degree view are installed as the cameras 700 on the base stations 100, images of the entire area of the small cells 300 of the base stations 100 can be efficiently acquired with a single camera. Additionally, the cameras 700 may be installed near the borders of the small cells 300-1, 300-2 to acquire images of objects entering the small cells 300-1, 300-2 and images of objects exiting the small cells 300-1, 300-2.

The cameras 700 transfer the captured images to the control system 800 (not illustrated) to be described below. At this time, the images may be successively transferred from the cameras 700 to the control system 800 or may be transferred intermittently over time. Alternatively, the transfer timing of images from the cameras 700 to the control system 800 may be set in accordance with the characteristics of application services that are expected to be used in the small cells 300.

Figure 2:
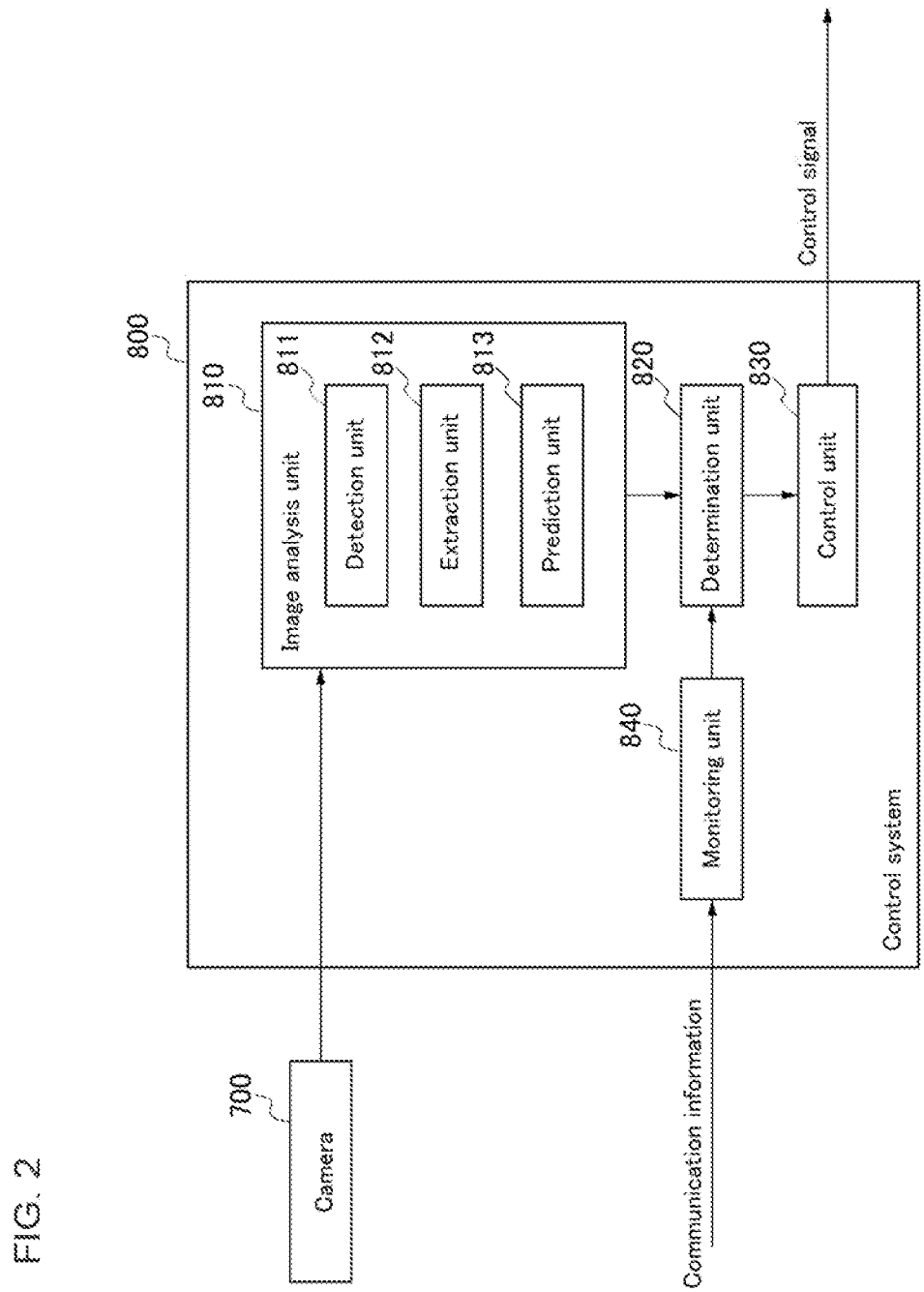
FIG. 2 is a functional block diagram illustrating the configuration of a control system according to the embodiment.

The control system 800 according to the present embodiment will be described by using FIG. 2. FIG. 2 is a block diagram illustrating the configuration of the control system 800. The control system 800 comprises an image analysis unit 810, a determination unit 820, and a control unit 830. The image analysis unit 810 comprises a detection unit 811, an extraction unit 812, and a prediction unit 813. The detection unit 811, the extraction unit 812, and the prediction unit 813 are not necessarily required to be provided together in the image analysis unit 810. Additionally, the control system 800 may further comprise a monitoring unit 840, and the determination unit 820 may acquire monitoring results from the monitoring unit 840.

The detection unit 811 acquires multiple successive images (hereinafter, the respective images may also be referred to as "frames") of captured image data transferred from the cameras 700, and detects people or vehicles moving in the small cells 300 as objects by analyzing the multiple successive images. In this case, examples of the vehicles include moving vehicles such as automobiles, motorcycles, or robots, or unmanned flying machines such as drones. Additionally, the detection unit 811 may further detect radio terminals that the objects have.

The images may be two-dimensional images or may be three-dimensional images. Additionally, the algorithm for detecting objects in the image analysis unit 810 is not particularly limited. For example, a method using feature amounts or the like, such as HOG (Histograms of Oriented Gradients), may be used, or a support vector machine (SVM) may be used.

The extraction unit 812 extracts object information relating to an object detected by the detection unit 811. The object information includes at least one of attribute information relating to an attribute of the object and object behavior information relating to a behavioral characteristic of the object.

In the case in which an object is a person, the object attribute information includes at least one of the age of that person, the sex of that person, and terminal attribute information relating to an attribute of the radio terminal that the person has. The terminal attribute information is information that can be used to predict whether the radio terminal will be associated with the presence or absence of communication demand for a base station 100 capable of high-speed, high-capacity communication. An example of the terminal attribute information is the type of radio terminal. Examples of the type of radio terminal include smartphones, tablets, and portable PCs (Personal Computers).

Additionally, in the case in which an object is a vehicle, the object attribute information includes at least one of the vehicle type of the vehicle, information indicating whether or not the vehicle has the functions of an ICT (Information and Communication Technology) terminal, and terminal attribute information relating to an attribute of the radio terminal that the vehicle has. Examples of vehicles comprising terminals having ICT functions include vehicles such as connected cars and unmanned robots, and unmanned flying machines such as drones.

In the case in which the object is a person, the object behavior information includes at least one of a movement speed of the person, an amount of change in the movement speed of the person within a prescribed time period, a stationary time period of the person, and information relating to a carrying mode indicating how the person is carrying the radio terminal. Additionally, in the case in which the object is a vehicle, the object behavior information includes at least one of a movement speed of the vehicle, an amount of change in the movement speed of the vehicle within a prescribed time period, and a stationary time period of the vehicle.

The movement speed of the object is computed, for example, by dividing the distance between a position of the object in a certain frame and the position of the object in the next frame by the time period between the frames. Additionally, the amount of change in the movement speed of the object is computed by successively computing the movement speed of the object.

An example of a UE carrying mode indicating how a person is carrying a UE is a mode regarding how the person is holding the UE (for example, if the person is holding the UE in a hand), or a mode indicating how the person is carrying the UE, such as the posture of the person (for example, the person is looking at the screen of the UE), or an action performed on the UE by the person (the person having taken the UE out of a bag or a pocket). The mode can be used to predict whether or not the UE being carried by the person requires high-speed, high-capacity communication, or whether the UE is associated with the presence or absence of communication demand for a base station 100 capable of high-speed, high-capacity communication. The carrying mode may be extracted by making use of human-body posture analysis technologies utilizing artificial intelligence (AI: Artificial Intelligence), machine learning, deep learning, or the like.

The prediction unit 813 uses the object information to predict the communication demand for a base station 100 by a UE that a detected object has. In this case, the communication demand also includes connection requests.

The method for predicting the communication demand of the UE for a base station 100 in the prediction unit 813 will be described below.

(Example of Prediction Based on Object Attribute Information)

The attribute information of a person may include the age of the person. In general, the circumstances of use of a terminal differ depending on differences in age. For example, older age demographics tend to use terminals at high speeds and high capacity less frequently than younger age demographics do, and conversely, younger age demographics tend to use terminals at high speeds and high capacity more frequently. Additionally, in the case of preschool children of extremely low age, there is a tendency to use terminals at high speeds and high capacity with extremely low frequency. For this reason, the presence or absence of communication demand for a base station 100 can be predicted in accordance with an assessed age of the person.

The attribute information of a vehicle may include information, such as the vehicle type of the vehicle and information indicating whether or not the vehicle has the functions of an ICT (Information and Communication Technology) terminal. A connected car having the functions of an ICT terminal is one mode of use being considered for B5G, and another expected mode of use is for a passenger or, in the case in which automated driving is made possible, the driver, to watch movies in a car.

Additionally, terminal attribute information of a radio terminal that an object has may be an example of attribute information for the object. For example, in the case in which the image analysis unit 810 can identify the type of UE that a person has from an image, the communication demand can be predicted based on the type of UE. If the type of UE is a smartphone, a tablet terminal, or a portable PC, the likelihood that the UE will use a high-speed, high-capacity application can be considered to be high.

(Example of Prediction Based on Object Behavior Information)

In the case in which a person or vehicle, such as a seated person or a parked automobile, remains at the same location without moving and the stationary time period is long, the likelihood that the person or a passenger in the vehicle will use a high-speed, high-capacity application on a carried UE can be considered to be high. The prediction unit 813 compares the stationary time period of the person or the vehicle with a prescribed threshold value and predicts that there will be communication demand if the stationary time period exceeds a threshold value. The threshold value may be set in accordance with the conditions in the small cells 300 that is the coverage area of a base station 100, including the hour of day, such as whether daytime or nighttime, the weather conditions, such as whether sunny or raining, or the geographical area. Alternatively, the threshold value may be set in accordance with what the object is.

In general, when a person is moving at a high speed and the person is not holding a UE in a hand, the frequency at which the UE will use high-speed, high-capacity applications can be considered to be low. Conversely, if a person is moving at a relatively low speed and the person is holding the UE in a hand, particularly when the person is watching the screen of the UE or has started to watch the screen of the UE, the likelihood that the UE is being used or will start being used to run a high-speed, high-capacity application is estimated to be high. The prediction unit 813 can predict communication demand based on the movement speed of a person and the mode in which the person is carrying the UE (the posture of the person). Additionally, in the case in which the person has taken the UE out of a bag or a pocket, the likelihood that the person will start using the UE is high, and in such a case, it is predicted that there will be communication demand. The prediction unit 813 may use technology such as artificial intelligence, machine learning, or deep learning to learn and successively update the relationship between the communication demand and the carrying mode indicating how a person is carrying the UE, and use this relationship to predict the communication demand.

The prediction unit 813 holds, for example, a correspondence table with object attribute information, object behavior information, and communication demand in an internal memory, and may refer to the correspondence table to predict whether or not there will be communication demand from a detected object. Additionally, the prediction unit 813 may predict communication demand by combining object attribute information and object behavior information.

The prediction unit 813 may use technology such as artificial intelligence, machine learning, or deep learning to learn the relationship between the object information and communication demand, and predict the communication demand from a UE that the object has.

In this way, the detection unit 811 detects prescribed objects from images acquired by a camera, and the extraction unit 812 extracts, from the images, object information associated with the detected objects. Due to the extraction unit 812 extracting the object information, which is related to the presence or absence of communication demand for a first base station 100 from a radio terminal that an object has, the prediction unit 813 can predict the communication demand for the base station 100 from a radio terminal that the detected object has. The prediction unit 813 notifies the determination unit 820 of the prediction result. The image analysis unit 810 may notify the determination unit 820 of results indicating whether or not an object has been detected by the detection unit 811 in addition to the prediction result.

The determination unit 820 acquires the prediction result of the communication demand predicted by the prediction unit 813. The determination unit 820 may further acquire communication information monitored by the monitoring unit 840. Additionally, the determination unit 820 may further acquire results indicating whether or not an object has been detected by the detection unit 811. The determination unit 820 at least determines a setting in the base station 100 based on the prediction results provided from the prediction unit 813. The method by which the determination unit 820 determines the setting in the base station 100 will be described below.

The control unit 830 controls the base station in accordance with the setting determined by the determination unit 820. The specific control method of the control unit 830 will be described below.

The monitoring unit 840 continually or periodically monitors communication information relating to communication between a UE and a base station 200 forming a macrocell. For example, the monitoring unit 840 monitors at least one of traffic volume and data type, and outputs the communication information to the determination unit 820 as a monitoring result.

(Regarding the Configurations of the Base Stations)

A high-frequency base station 100 included in the above-mentioned radio communication system will be described.

Figure 3:
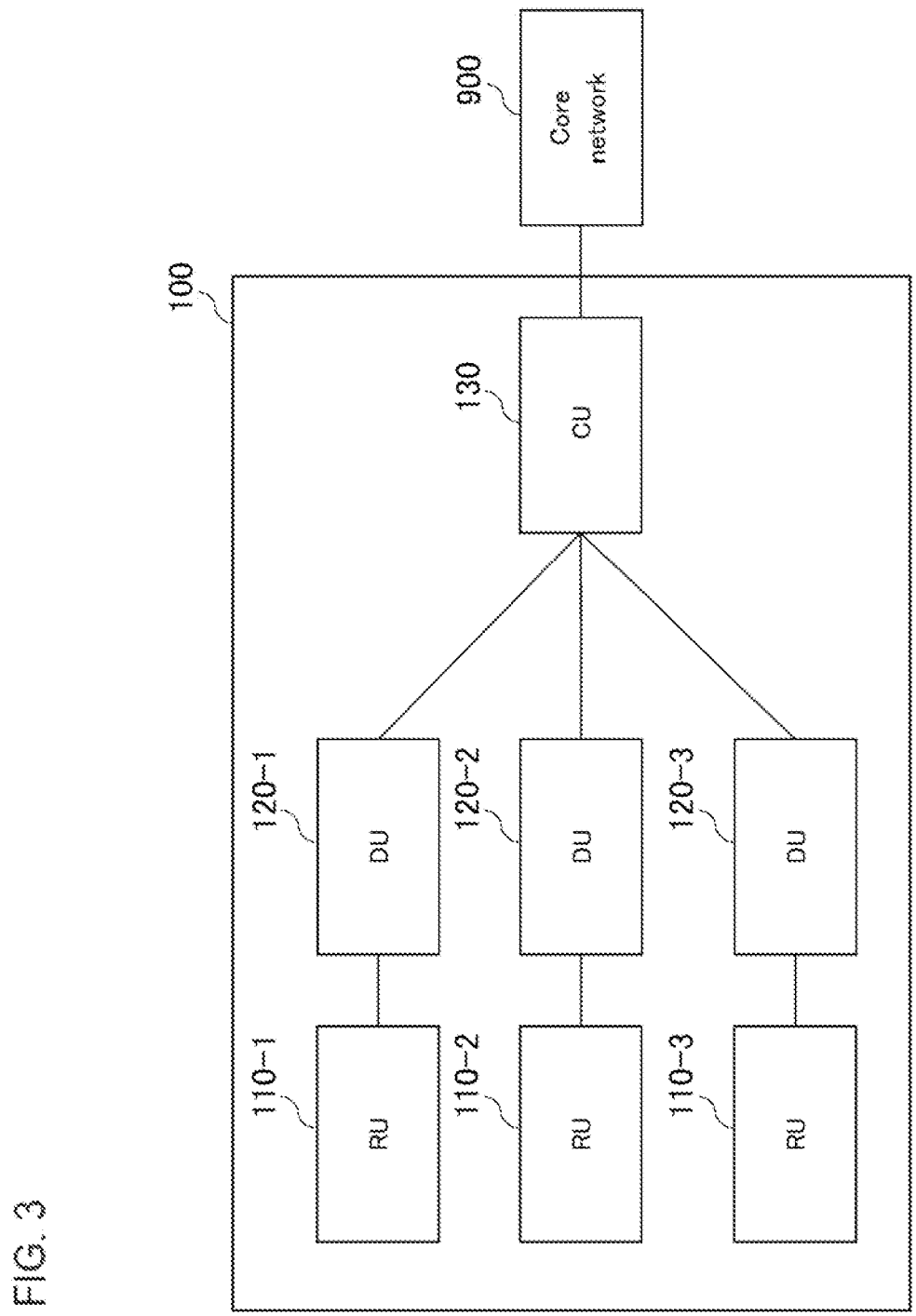
FIG. 3 is a diagram illustrating an example of the configuration of a base station.

FIG. 3 is a diagram illustrating an example of the configuration of a base station 100. The base station in a 5G system, known as a gNB, is configured by including RU (Radio Unit) functions, DU (Distributed Unit) functions, and a CU (Central Unit) function. In this case, DUs 120-1, 120-2, 120-3 (hereinafter referred to collectively as DUs 120) perform layer processes including at least a physical (PHY) layer, and a CU 130 performs layer processes including a radio resource control (RRC: Radio Resource Management) layer at a level higher than the layers in which the DUs 120 perform processes. Additionally, multiple DUs 120 may be connected to a single CU 130. Additionally, one or more RUs 110-1, 110-2, 110-3 (hereinafter referred to collectively as RUs 110) are connected to a single DU 120. The RUs 110 form one or more beams, for example, by beam forming, and use one of those beams to establish a connection with a UE. That is, the base station 100 is configured so as to include a CU 130, one or more DUs 120 connected to that CU 130, and one or more RUs 110 connected to the DUs 120. Each RU 110 forms one or more beams, thus many beams are formed, and a UE 500 is connected by one of these multiple beams.

The RU functions, the CU function, and the DU functions are known as a radio access network (RAN: Radio Access Network), and the CU of the RAN is connected to a core network (CN: Core Network) 900.

Of the RU functions, the CU function, and the DU functions of the base station 100, each of the above-mentioned DU functions and the CU function may be configured by virtualization. By virtualizing the DU functions and the CU function to form a virtualized CU (vCU) and virtualized DUs (vDUs), dedicated servers that have been necessarily for configuring a base station 100 until now can be replaced with a general-purpose server, and the base station 100 can be inexpensively and flexibly constructed. Meanwhile, if they are not virtualized, then the DU functions and the CU function must be installed on the same dedicated server.

Thus, the dedicated server needed to be replaced even if a problem occurred in just one of the DU functions and the CU function. In contrast therewith, by virtualization, the virtualized CU and the virtualized DU can be distributively located in different general-purpose servers, allowing only a virtualized CU or a virtualized DU in which a problem has occurred to be removed and reconstructed. For this reason, the impact on services when a malfunction occurs can be kept to a minimum. Additionally, the general-purpose servers on which a virtualized DU or a virtualized CU is located can be easily changed, thus allowing the load on the general-purpose servers to be flexibly controlled.

A number of forms have been considered regarding the arrangement of virtualized DUs and virtualized CUs. The arrangements of the units in the control system 800 according to the present embodiment may also take various several forms in accordance with the arrangements of the virtualized DUs and the virtualized CU.

Figure 4:
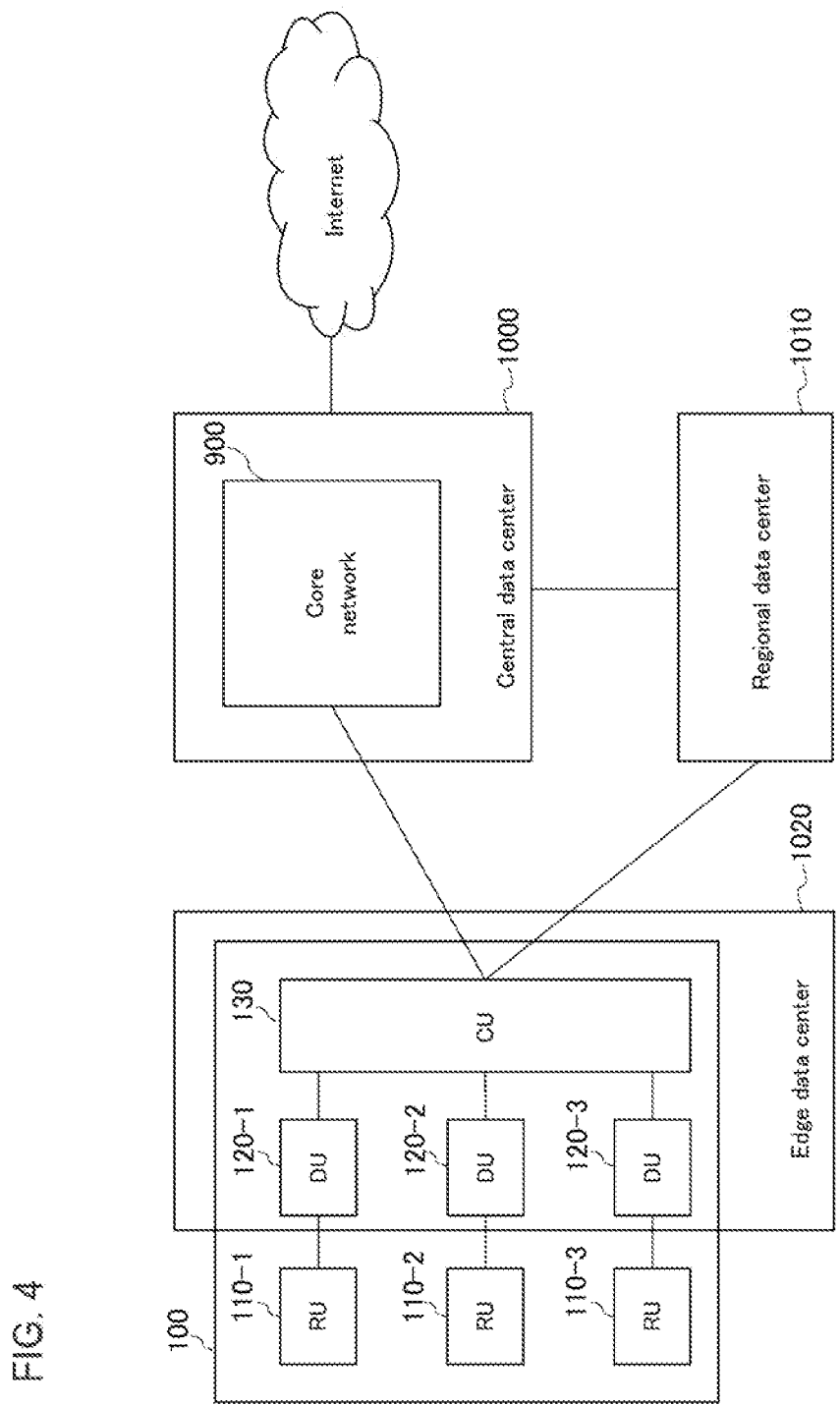
FIG. 4 is a diagram illustrating an example of the configuration of a radio communication system to which a control system according to an embodiment is applied.

FIG. 4 is a diagram illustrating an example of the configuration of a radio communication system in which a control system 800 according to the present embodiment is used. As illustrated in FIG. 4, the data center groups included in the radio communication system are classified as central data centers 1000, regional data centers 1010, and edge data centers 1020.

There are multiple central data centers (CDCs: Central Data Centers) 1000 distributively located in an area (for example, Japan) covered by the radio communication system. Located in the CDCs are next-generation systems, for example, 5GCs, which are core networks in 5G systems, EPCs, which are core networks in 4G systems, and OSSs (Operation Support Systems)/BSSs (Business Support Systems), etc.

There are, for example, dozens of regional data centers (RDCs: Regional Data Centers) 1010 distributively located in the area covered by the radio communication system. For example, in the case in which the area covered by the radio communication system is the entire country of Japan, one or two regional data centers 1010 may be located in each prefecture.

Several thousand edge data centers 1020 are distributively located in the area covered by the radio communication system.

FIG. 4 illustrates an example in which the DUs and the CU of a base station 100 are located in an edge data center 1020. However, in the case in which virtualization technology is applied to the RAN, then the vCU may be located in a regional data center 1010.

The units constituting the control system 800 according to the present embodiment can be flexibly located in an edge data center 1020 or in a regional data center 1010 in accordance with the locations of the vDUs and the vCU in the base station 100. Additionally, in the case in which MEC (Multi-access Edge Computing) is provided in the edge data center 1020 or the regional data center 1010, then some of the units constituting the control system 800 according to the present embodiment may be provided in the MEC.

Figure 5:
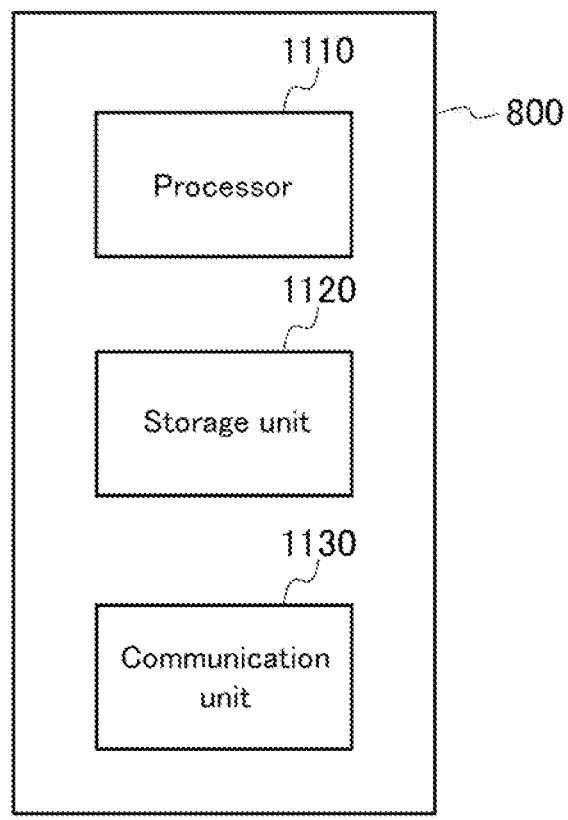
FIG. 5 is a diagram illustrating a computer system in which the control system is installed.

FIG. 5 is a diagram illustrating a computer system in which the control system 800 according to the present embodiment is installed. The control system 800 includes a processor 1110, a storage unit 1120, and a communication unit 1130. The numbers of the processor 1110, the storage unit 1120, and the communication unit 1130 are not limited, and there may be one or more. Additionally, the processor 1110, the storage unit 1120, and the communication unit 1130 may be located together at the places in which the units constituting the control system 800 are located. The processor 1110 is a program control device such as a microprocessor that operates in accordance with a program installed in the control system 800. The storage unit 1120 is a storage element such as a ROM or a RAM, or a storage device such as a solid-state drive (SSD) or a hard disk drive (HDD). The storage unit 1120 stores a program or the like to be executed by a processor 22. The communication unit 1130 is a communication interface such as, for example, an NIC or a wireless LAN module. An SDN (Software-Defined Network) may be installed in the communication unit 1130. The communication unit 1130 exchanges data with a base station 100, a base station 200, a camera 700, or a core network 900.

Next, using the sequence diagrams in FIG. 6A, FIG. 6B, FIG. 6C, and FIG. 6D, the control method in the control system 800 according to the present invention will be described with a focus on the operations in the determination unit 820 and the control unit 830 in the control system 800.

In FIG. 6A, FIG. 6B, FIG. 6C, and FIG. 6D, the low-frequency RAN corresponds to the base station 200, which forms a macrocell 400, and the high-frequency RAN corresponds to the base station 100, which forms a small cell 300. The high-frequency RAN comprises a CU function and DU functions. The low-frequency RAN comprises a CU function and DU functions. The high-frequency RAN and the low-frequency RAN may comprise BBU (Baseband Unit) functions in addition to the CU functions and the DU functions.

Figure 6A:
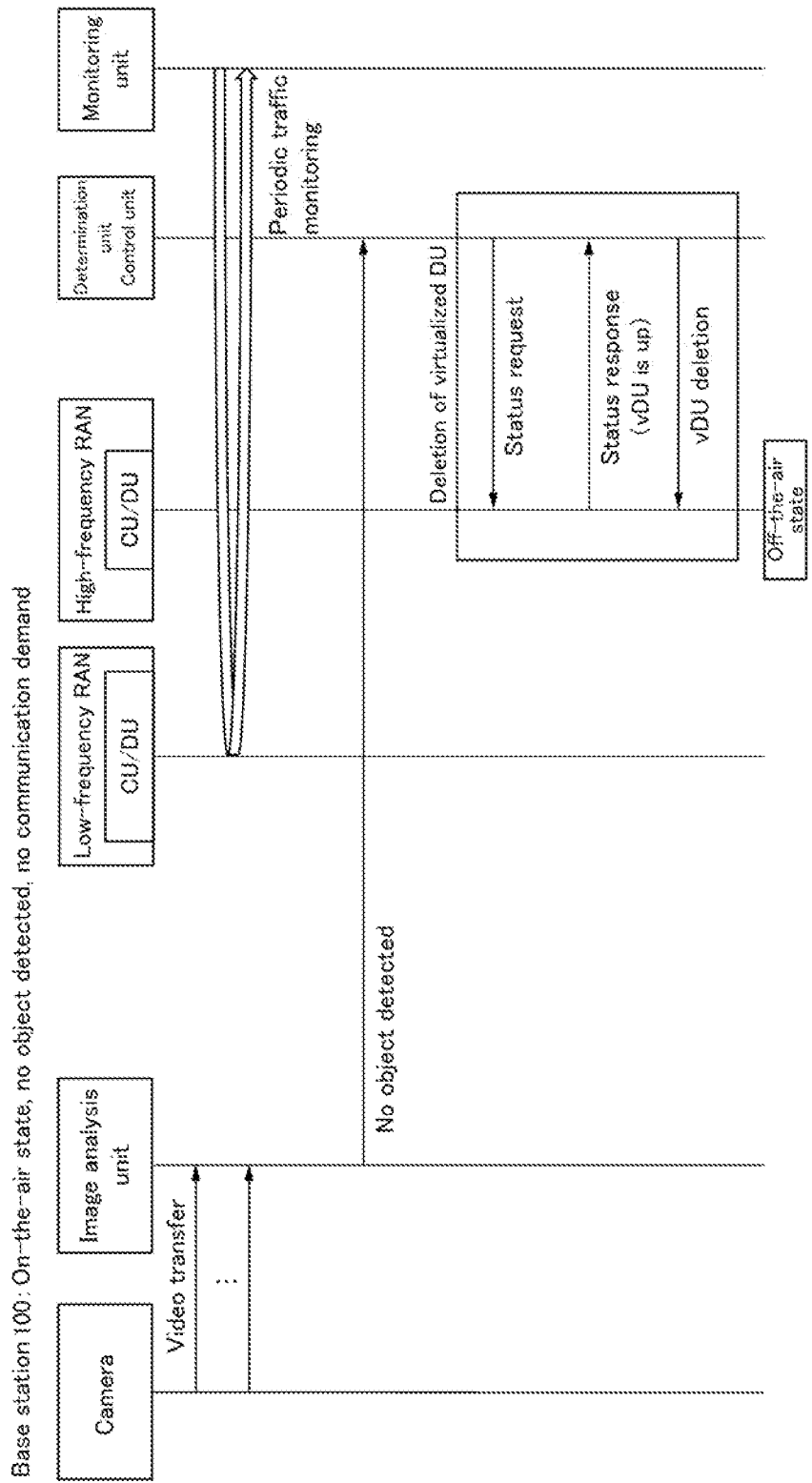
FIG. 6A is a diagram illustrating an example of a processing sequence implemented in the control system according to an embodiment.

FIG. 6A is a sequence diagram for the control method in the case in which the base station 100 is in the on-the-air state, no objects have been detected within a prescribed time period, and there is predicted to be no communication demand.

An image captured by the camera 700 is transferred to the image analysis unit 810. The detection unit 811, the extraction unit 812, and the prediction unit 813 in the image analysis unit 810, as previously described, perform image analysis, such as by human body posture analysis technology, to predict the communication demand from a UE that an object has. If, as a result thereof, no people or vehicles have been present in the small cell 300 for a prescribed time period (within the time period t) and there is predicted to be no communication demand, then the prediction unit 813 notifies the determination unit 820 of a prediction result indicating so.

The determination unit 820 acquires the high-frequency RAN state indicating whether the high-frequency RAN is in an off-the-air state or an on-the-air state. As the method for acquiring the high-frequency RAN state, the determination unit 820 notifies a DU in the high-frequency RAN of a status request and acquires the status by means of a status response transmitted from the DU in the high-frequency RAN in response to the status request. FIG. 6A illustrates an example in which the high-frequency RAN comprises a virtualized DU, and the determination unit 820 is provided with a status response indicating that the virtualized DU is in the active state (vDU is up). Additionally, information regarding the latest state of the high-frequency RAN may be held in a memory and the determination unit 820 may acquire the latest state of the high-frequency RAN from the memory. However, there is no limitation thereto.

In the case in which the high-frequency RAN is in the on-the-air state and the prediction result in the prediction unit 813 indicates that there will be no communication demand, the determination unit 820 determines a setting for the base station 100 such that the high-frequency RAN is controlled to be in an off-the-air state. As a method for controlling the base station 100 to be in the off-the-air state, the control unit 830 may control the base station 100 to be in the off-the-air state by controlling the RU in the base station 100 to be turned off. As a result thereof, the power consumption in the base station 100 can be reduced when there is deemed to be no need for high-speed, high-capacity communication.

Additionally, in the case in which the high-frequency RAN comprises a virtualized DU, the control unit 830 may control the base station 100 to be in the off-the-air state by deleting the virtualized DU from the base station 100. FIG. 6A illustrates an example in which the high-frequency RAN comprises a virtualized DU and the high-frequency RAN is controlled to delete the virtualized DU. In such a case, in addition to being able to reduce the power consumption in the base station 100, the consumption of virtual resources in the edge data center in which the virtualized DU is located can also be reduced.

Additionally, in the case in which the high-frequency RAN comprises a virtualized DU, instead of controlling the base station 100 so as to suddenly enter an off-the-air state, the determination unit 820 may determine that the virtualized DU should be scaled in as a setting for the virtualized DU. In this case, the power consumption in the base station 100 can be reduced and the consumption of virtual resources in the edge data center in which the virtualized DU is located can be reduced while allowing communication to be established between the base station 100 and a UE.

Figure 6B:
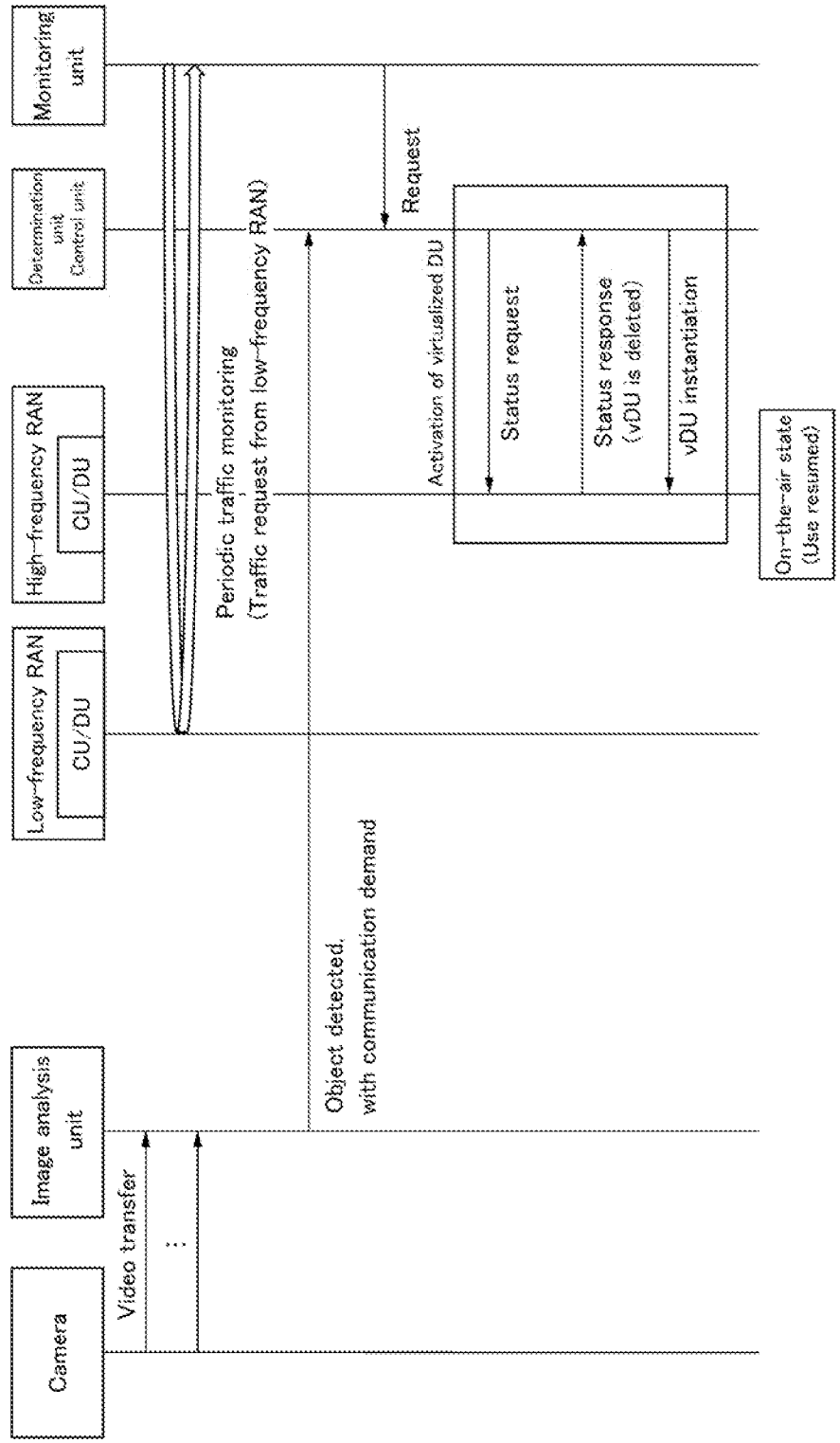
FIG. 6B is a diagram illustrating an example of a processing sequence implemented in the control system according to an embodiment.

FIG. 6B is a sequence diagram for the control method in the case in which the base station 100 is in the off-the-air state, an object has been detected, and there is predicted to be communication demand for the base station 100 from a UE that the object has. In the description below, the descriptions that overlap with those for FIG. 6A will be omitted.

In the case in which the prediction result in the prediction unit 813 indicates that there will be communication demand, the determination unit 820 checks communication information, which is the monitoring result from the monitoring unit 840, and if there is a traffic request, then the setting of the base station 100 is determined such that the high-frequency RAN is controlled to be in an on-the-air state. The determination unit 820 may determine the setting of the base station 100 such that the high-frequency RAN is controlled to be in an on-the-air state in the case in which the communication information indicates that the data type is user-plane information.

As the method for controlling the base station 100 to transition from the off-the-air state to the on-the-air state, for example, in the case in which the base station 100 is in the off-the-air state due to the RU being controlled to be off, the control unit 830 controls the RU in the base station 100 to be on, thereby controlling the base station 100 to be in the on-the-air state. Additionally, the base station 100 comprises a virtualized DU, and as illustrated in FIG. 6B, in the case in which the virtualized DU (vDU) in the base station 100 is deleted and the base station 100 is in the off-the-air state (vDU is deleted), the control unit 830 controls the base station 100 to be in the on-the-air state by instantiating (re-activating) the virtualized DU in the base station 100. As a result thereof, high-speed, high-capacity communication with the base station 100 becomes possible.

Figure 6C:
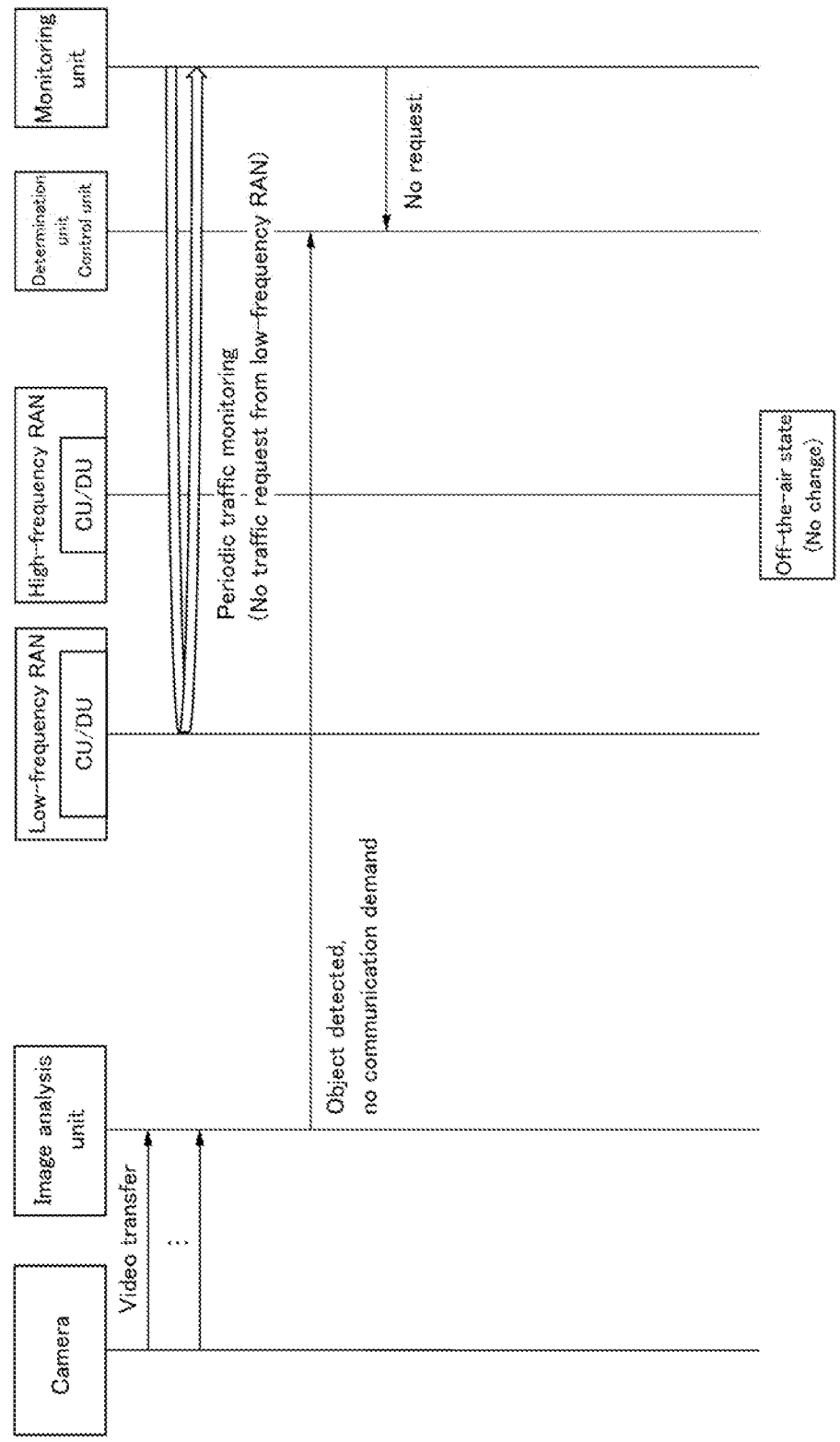
FIG. 6C is a diagram illustrating an example of a processing sequence implemented in the control system according to an embodiment.

FIG. 6C is a sequence diagram for the control method in the case in which the base station 100 is in the off-the-air state and an object has been detected, yet there is predicted to be no communication demand for the base station 100 from a UE that the object has.

In the case in which an object has been detected, yet the prediction result in the prediction unit 813 indicates that there will be no communication demand, the determination unit 820 checks the communication information, which is the monitoring result in the monitoring unit 840. If the communication information indicates that there is no traffic request, then the determination unit 820 determines the setting in the base station 100 such that the high-frequency RAN is controlled to be in the off-the-air state. Additionally, the setting in the base station 100 may be determined such that the high-frequency RAN is controlled to be in the off-the-air state in the case in which the communication information indicates that the data type is not user-plane information. Additionally, the setting in the base station 100 may be determined such that the high-frequency RAN is controlled to be in the on-the-air state in the case in which the communication information indicates that the data type is user-plane information. By checking the communication information, it can be estimated whether or not the UE that the detected object has requires high-speed, high-capacity communication. For this reason, in cases in which the prediction result in the prediction unit 813 indicates that there will be no communication demand, yet it can be estimated that the UE that the detected object has will actually require high-speed, high-capacity communication, situations in which the base station 100 is kept in the off-the-air state can be avoided, and decreases in the availability of the UE that the object has can be avoided.

In the example indicated in FIG. 6C, there is no traffic request and it is estimated that the UE that the detected object has will not require high-speed, high-capacity communication. Thus, the base station 100 continues to be kept in the off-the-air state.

FIG. 6D is a sequence diagram for the control method in the case in which the base station 100 is in the on-the-air state and it has been predicted that there will be communication demand for the base station 100 from a UE that an object has.

In the case in which the prediction result in the prediction unit 813 indicates that there will be communication demand, the determination unit 820 determines the setting in the base station 100 such that the high-frequency RAN is controlled to be in the on-the-air state. In FIG. 6D, the base station 100 is in the on-the-air state. Thus, the base station 100 continues to be kept in the on-the-air state. In the prediction unit 813, the traffic demand volume in the UE that the object has is predicted, and in the case in which the high-frequency RAN comprises a virtualized DU, the determination unit 820 may determine the setting in the base station 100 by the following process as a method for maintaining an on-the-air state. In other words, as the method for maintaining the on-the-air state, the determination unit 820 may determine that some of the virtualized components constituting a virtualized DU are to be added or determine that a new virtualized DU is to be added, and the control unit 830 may scale out or instantiate a virtualized DU. As a result thereof, decreases in the availability of the UE that the object has can be avoided. The traffic demand volume can, for example, be predicted from the object information by the extraction unit 812 and the prediction unit 813 using technology such as artificial intelligence, machine learning, or deep learning.

Figure 7:
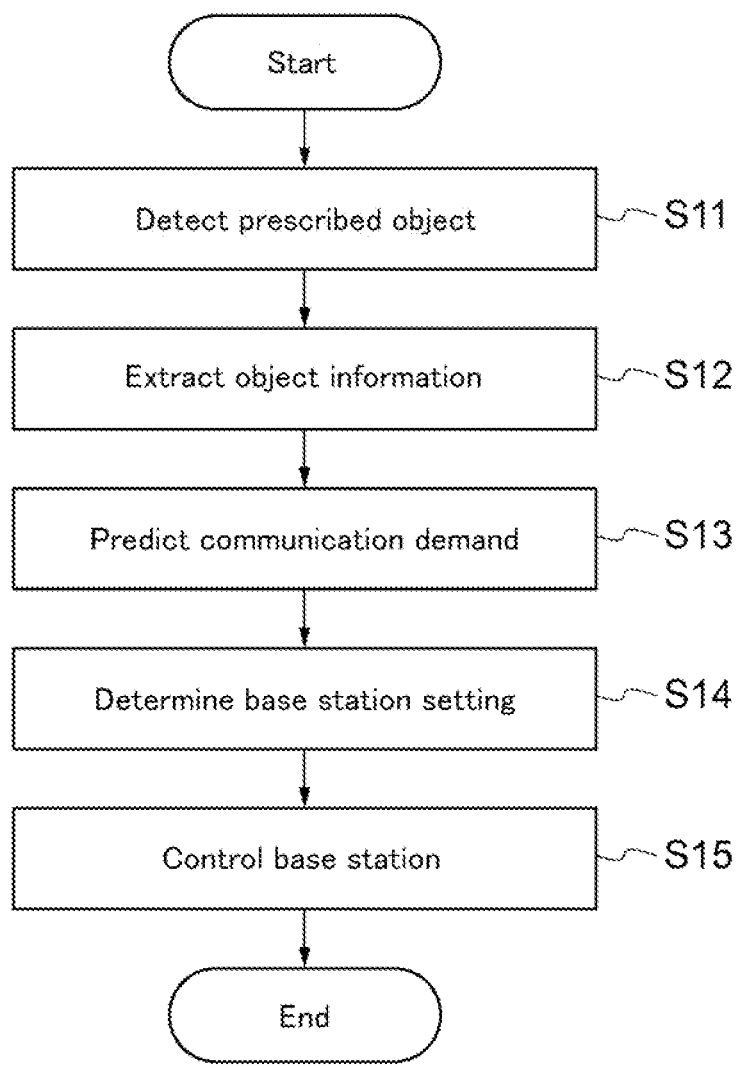
FIG. 7 is a diagram illustrating a flow chart for a control method according to an embodiment.

FIG. 7 is a diagram illustrating a flow chart of the control method according to the present embodiment.

The detection unit 811 detects a prescribed object in an image acquired by a camera (S11).

The extraction unit 812 extracts, from the image, object information including at least one of object attribute information relating to an attribute of the object and object behavior information relating to a behavioral characteristic of the object (S12).

The prediction unit 813 predicts, based on the object information, the communication demand for a base station 100 from a radio terminal that the detected object has (S13).

The determination unit 820 acquires the communication demand predicted in the prediction unit 813 and communication information relating to communication between the radio terminal and a base station 200 forming a macrocell 400, monitored in an optional monitoring unit 840. The determination unit 820 determines a setting of the base station 100 based on at least the communication demand (S14).

The control unit 830 controls the base station 100 in accordance with the determined setting (S15).

As described above, in the control system 800 according to the present embodiment, the detection unit 811 detects a prescribed object in an image acquired by a camera, and the extraction unit 812 extracts, from the image, object information relating to the detected object. Due to the extraction unit 812 extracting object information relating to the presence or absence of communication demand for the first base station 100 from the radio terminal that the object has, the prediction unit 813 can predict the communication demand for the base station 100 from the radio terminal that the detected object has. If the prediction unit 813 has predicted that there will be no communication demand, then the determination unit 820 determines that the RU in the base station 100 is to be turned off, and the control unit 830 controls the base station 100 to be in a suspended state. As a result thereof, the power consumption in the base station 100 can be reduced. Additionally, in the case in which the base station 100 comprises a vDU, if the prediction unit 813 has predicted that there will be no communication demand, then the control unit 830 determines that the vDU in the base station 100 should be deleted, and the control unit 830 controls the base station 100 to be in a suspended state. As a result thereof, the power consumption in the base station 100 can be reduced, and the consumption of virtual resources in the edge data center in which the virtualized DU is located can be reduced. Additionally, if the prediction unit 813 has predicted that there will be no communication demand, then the determination unit 820 may control the base station 100 to be in a non-suspended state and scale in the vDU in the base station 100. As a result thereof, the power consumption in the base station 100 can be reduced and the consumption of virtual resources in the edge data center in which the virtualized DU is located can be reduced while allowing communication to be established. Additionally, if the prediction unit 813 predicts a traffic demand volume from the UE that the object has, the determination unit 820 may, as a method for maintaining an on-the-air state, determine that some of the virtualized components constituting a virtualized DU should be added, or that a virtualized DU should be newly added. As a result thereof, decreases in the availability of the UE that the object has can be avoided.

In the case in which the base station 100 is virtualized in accordance with NFV reference architecture, the control unit 830 may, for example, control the base station 100 in accordance with the determination result in the determination unit 820 by using an NFV MANO (Management and Orchestration) function in the NFV reference architecture. Additionally, in the case in which container-type virtualization technology is applied to the construction of the RAN, and the DU functions and the CU function are constructed with containers, the determination unit 820 may determine that a container corresponding to the DU function should be deleted as a setting in the base station 100 for putting the RAN in the suspended state. Additionally, the determination unit 820 may determine that the container corresponding to the DU function should be activated as a setting in the base station 100 for putting the RAN in a non-suspended state. Additionally, the units in the control system 800 may be located in accordance with the modes of construction and arrangement of the RAN.

The present invention is not limited to the configurations mentioned above, and the present invention also includes a control program. Specifically, a control program for making one or more processors execute the respective units in the control system 800 is also included in the present invention.

Additionally, the present invention is not limited to the embodiments described above, and includes various modified examples in which constituent elements have been added, removed or replaced with respect to the configurations indicated above.

REFERENCE SIGNS LIST

100, 100-1, 100-2 Base station
110, 110-1, 110-2, 110-3 RU (Radio Unit)
120, 120-1, 120-2, 120-3 DU (Distributed Unit)
130 CU (Central Unit)
200 Base station
300, 300-1, 300-2 Small cell
400 Macrocell
500-1, 500-2 UE
600-1, 600-2 Object
700, 700-1, 700-2 Camera
800 Control system
810 Image analysis unit
811 Detection unit
812 Extraction unit
813 Prediction unit
820 Determination unit
830 Control unit
840 Monitoring unit
900 Core network
1000 Central data center (CDC: Central Data Center)
1010 Regional data center (RDC: Regional Data Center)
1020 Edge data center
1110 Processor
1120 Storage unit
1130 Communication unit

The invention claimed is:
1. A control system comprising:
a memory storing a computer program;
one or more processors configured to execute the computer program to:
detect a prescribed object in an image acquired by a camera, the detected object having a radio terminal;
extract, from the image, object information relating to the detected object,
predict, based on the object information, communication demand for a base station from the radio terminal of the detected object,
determine a setting of the base station based on the predicted communication demand, and
control the base station in accordance with the determined setting.
2. The control system according to claim 1, wherein the object information includes at least one of: object attribute information relating to an attribute of the object, and object behavior information relating to a behavioral characteristic of the object.

3. The control system according to claim 1, wherein the one or more processors are further configured to execute the computer program to:
monitor communication information relating to communication between the radio terminal and a second base station having a coverage area at least partially overlapping with a coverage area of a first base station, which is the aforementioned base station, and using a carrier frequency lower than a carrier frequency of the first base station, and
determine the setting further based on the monitored communication information.

4. The control system according to claim 3, wherein the communication information includes at least one of traffic volume and data type.

5. The control system according to claim 1, wherein:
the first base station, which is the aforementioned base station, comprises an RU (Radio Unit), a DU (Distributed Unit), and a CU (Centralized Unit); and
the one or more processors are further configured to execute the computer program to:
determine, as the setting, that the RU in the first base station is to be turned either on or off, and
control the first base station to be in either an off-the-air state or an on-the-air state by controlling the RU in the first base station to be either on or off.

6. The control system according to claim 1, wherein:
the first base station, which is the aforementioned base station, comprises an RU (Radio Unit), a virtualized DU (Distributed Unit), and a virtualized CU (Centralized Unit); and
the one or more processors are further configured to execute the computer program to:
determine, as the setting, whether to delete or to instantiate the virtualized DU, and
control the first base station to be in an off-the-air state by deleting the virtualized DU, and control the first base station to be in an on-the-air state by instantiating the virtualized DU.

7. The control system according to claim 1, wherein:
the first base station, which is the aforementioned base station, comprises an RU (Radio Unit), a virtualized DU (Distributed Unit), and a virtualized CU (Centralized Unit); and
the one or more processors are further configured to execute the computer program to:
determine, as the setting, whether to delete, to scale in, to scale out, or to instantiate the virtualized DU, and
control the first base station to be in an off-the-air state by deleting the virtualized DU, and control the first base station to be in an on-the-air state by scaling in, scaling out, or instantiating the virtualized DU.

8. The control system according to claim 2, wherein:
the object is a person;
the object attribute information includes at least one of an age of the person, a sex of the person, and a type of radio terminal that the person has; and
the object behavior information includes at least one of a movement speed of the person, an amount of change in the movement speed of the person within a prescribed time period, a stationary time period of the person, and information relating to a carrying mode indicating how the person is carrying the radio terminal.

9. The control system according to claim 2, wherein:
the object is a vehicle;
the object attribute information includes at least one of information indicating whether or not the vehicle has functions of an ICT (Information and Communication Technology) terminal, and a type of radio terminal that the vehicle has; and
the object behavior information includes at least one of a movement speed of the vehicle, an amount of change in the movement speed of the vehicle within a prescribed time period, and a stationary time period of the vehicle.

10. The control system according to claim 1, wherein the image is an image of at least a part of a coverage area of a first base station, which is the aforementioned base station.

11. A control method performed by one or more processors, the control method including:
detecting a prescribed object in an image acquired by a camera, the detected object having a radio terminal;
extracting, from the image, object information relating to the detected object;
predicting, based on the object information, communication demand for a base station from the radio terminal of the detected object;
determining a setting of the base station based on the predicted communication demand; and
controlling the base station in accordance with the determined setting.

12. The control system according to claim 1, wherein the detected object is a person, and the object information includes object behavior information relating to a behavioral characteristic of the person.

13. The control system according to claim 1, wherein the detected object is a vehicle, and the object information includes at least one of information indicating whether or not the vehicle has functions of an ICT (Information and Communication Technology) terminal, and a type of the radio terminal that the vehicle has.

* * * * *